United States Patent
Werner et al.

(10) Patent No.: US 10,702,947 B2
(45) Date of Patent: Jul. 7, 2020

(54) DEVICE AND METHOD OF PRODUCING A STRUCTURED ELEMENT, AND STRUCTURED ELEMENT

(71) Applicant: 3D-Micromac AG, Chemnitz (DE)

(72) Inventors: Michael Werner, Chemnitz (DE); Robin Zimny, Zwickau (DE)

(73) Assignee: 3D-Micromac AG, Chemnitz (DE)

( * ) Notice: Subject to any disclaimer, the term of this patent is extended or adjusted under 35 U.S.C. 154(b) by 329 days.

(21) Appl. No.: 15/579,130

(22) PCT Filed: May 11, 2016

(86) PCT No.: PCT/EP2016/060552
§ 371 (c)(1),
(2) Date: Dec. 1, 2017

(87) PCT Pub. No.: WO2016/192938
PCT Pub. Date: Dec. 8, 2016

(65) Prior Publication Data
US 2018/0161924 A1 Jun. 14, 2018

(30) Foreign Application Priority Data
Jun. 3, 2015 (DE) .................. 10 2015 210 286

(51) Int. Cl.
*B23K 26/0622* (2014.01)
*B23K 26/57* (2014.01)
(Continued)

(52) U.S. Cl.
CPC ...... *B23K 26/0624* (2015.10); *B23K 26/0006* (2013.01); *B23K 26/03* (2013.01);
(Continued)

(58) Field of Classification Search
CPC .. B23K 26/0624; B23K 26/146; B23K 26/57; B23K 26/0006; B23K 26/03;
(Continued)

(56) References Cited

U.S. PATENT DOCUMENTS 6,362,453 B1    3/2002  Wang et al.
7,985,367 B2 *  7/2011  Hiromatsu ............. B82Y 30/00
                                              264/21

(Continued)

FOREIGN PATENT DOCUMENTS

DE         199 12 879 A1    4/2000
DE    10 2005 055 174 B3    4/2007
(Continued)

OTHER PUBLICATIONS

German Official Action dated Jan. 11, 2016 of corresponding DE Application No. 10 2015 210 286.6.
(Continued)

*Primary Examiner* — Jennifer C Chiang
(74) *Attorney, Agent, or Firm* — DLA Piper LLP (US)

(57) ABSTRACT

A method produces a structured element by machining a workpiece with pulsed laser radiation, the workpiece including a workpiece material transparent to the laser radiation, the laser radiation being radiated into the workpiece from an entry side and, in an area of a rear side of the workpiece located opposite the entry side, being focused within the workpiece in a focus area such that workpiece material is removed in the focus area by multi-photon absorption, and includes bringing the rear side of the workpiece, at least in a machining area currently being machined around the focus area, into contact with a free-flowing liquid transparent to the laser radiation, wherein at least some of the liquid flows
(Continued)

in a direction towards the machining area such that the liquid flows into the machining area at an angle of 60° or less to the rear side.

15 Claims, 6 Drawing Sheets

(51) Int. Cl.
*B23K 26/146* (2014.01)
*B23K 26/00* (2014.01)
*B28D 1/22* (2006.01)
*C03B 33/02* (2006.01)
*C03B 33/08* (2006.01)
*B23K 26/03* (2006.01)
*B23K 26/06* (2014.01)
*B23K 26/402* (2014.01)
*B23K 103/00* (2006.01)

(52) U.S. Cl.
CPC ........ *B23K 26/0648* (2013.01); *B23K 26/146* (2015.10); *B23K 26/402* (2013.01); *B23K 26/57* (2015.10); *B28D 1/221* (2013.01); *C03B 33/0207* (2013.01); *C03B 33/082* (2013.01); *B23K 2103/42* (2018.08); *B23K 2103/54* (2018.08)

(58) Field of Classification Search
CPC .. B23K 26/0648; B23K 26/402; B28D 1/221; C03B 33/0207; C03B 33/082
USPC .................................................... 219/121.85
See application file for complete search history.

(56) References Cited

U.S. PATENT DOCUMENTS

| | | | |
|---|---|---|---|
| 9,815,144 B2 * | 11/2017 | Grundmueller | ........ B23K 26/57 |
| 2010/0133245 A1 | 6/2010 | Koops et al. | |
| 2013/0164457 A1 | 6/2013 | Ehlers et al. | |

FOREIGN PATENT DOCUMENTS

| | | |
|---|---|---|
| DE | 10 2011 051 198 A1 | 12/2012 |
| JP | 2000-15467 A | 1/2000 |

OTHER PUBLICATIONS

Vitek, D. N., et al., "Temporally focused femtosecond laser pulses for low numerical aperture micromachining through optically transparent materials", *Optics Express*, 2010, vol. 18, No. 17, pp. 18086-18094.

Li, Y., et al., "Three-dimensional hole drilling of silica glass from the rear surface with femtosecond laser pulses", *Optics Letters*, 2001, vol. 26, No. 23, pp. 1912-1914.

Ren, J., et al., "Laser ablation of silicon in water with nanosecond and femtosecond pulses", *Optics Letters*, 2005, vol. 30, No. 13, pp. 1740-1742.

Du, K., et al., "Subsurface precision machining of glass substrates by innovative lasers", *Glass Sci. Technol.*, 2003, vol. 76, No. 2, pp. 95-98.

Taiwanese Examination Report dated Dec. 23, 2019, of corresponding Taiwanese Application No. 105117347.

* cited by examiner

DEVICE AND METHOD OF PRODUCING A STRUCTURED ELEMENT, AND STRUCTURED ELEMENT

TECHNICAL FIELD

This disclosure relates to a method of producing a structured element by material-removing machining of a workpiece with pulsed laser radiation, a device that performs the method, and a structured element that can be obtained by the method.

BACKGROUND

To produce structured elements having a three-dimensional surface structure, it is known to machine the surface to be structured of the workpiece used to produce the element with focused laser radiation. If the workpiece consists of a workpiece material transparent to the laser radiation used, then laser-induced ablation is possible if operations are carried out in the area of multi-photon absorption (non-linear absorption).

For example, machining a workpiece from the front side with an ultra-short-pulse laser is known. The laser beam is focused onto the entry-side surface of the workpiece. Although the workpiece is transparent to the laser wavelength used (e.g. in the visible or NIR range), the focusing produces such a high intensity that ablation takes place at the workpiece surface as a result of multi-photon absorption. It is possible for only specific structures to be produced. For example, the wall angles of the removal are restricted by the parameters of the optical structure. Any desired steep angles cannot be produced even with tracking of the focus. In addition, for example, no structures with undercuts can be produced.

"Subsurface precision machining of glass substrates by innovative lasers" by K. Du and P. Shi in: Glass Sci. Technol. 76 (2003) No. 2 describes, amongst other things, a technique permitting precise hollow structures to be produced in glass, which would be impossible with conventional mechanical methods. It is also possible, otherwise than in the front-side process, for example, to produce structures with undercuts and a high aspect ratio. In the method, the laser beam from a nanosecond laser is radiated into the glass from the upper side and is focused on the opposite underside. It is possible for the evaporated glass material to freely flow away from the machining zone. By suitable deflection of the beam, it is possible to produce precise and reproducible holes with any desired cross section in the glass.

Laser-induced backside wet etching (LIBWE) is a method of introducing microstructures directly and with high quality into transparent dielectric materials. The etching process takes place on the rear side of the transparent sample, which is in contact with an absorbent liquid.

DE 19912879 A1 describes a method of etching a transparent substance with a pulsed laser beam, in which the side of the material opposite the laser-irradiated surface and in contact with a fluid absorbing the laser radiation is removed by absorption of the laser radiation by the fluid. The fluid claimed is a bath of a solution or dispersion of organic substances and inorganic pigments.

DE 102005055174 B3 describes a method of material removal by laser radiation of materials transparent to the laser wavelength by applying pulsed laser radiation to the side of the transparent material opposite with respect to the incident laser radiation and in contact with a liquid having a high absorption coefficient of greater than 1000 cm$^{-1}$ in the spectral range 0.2 to 11 µm, wherein the liquid has metallic properties.

It could be helpful to provide a generic method of producing a structured element permitting structured elements with very fine and cleanly defined three-dimensional surface structures to be created, and to provide a device that performs the method and also correspondingly produces structured elements.

SUMMARY

We provide a method of producing a structured element by material-removing machining of a workpiece with pulsed laser radiation, the workpiece consisting of a workpiece material transparent to the laser radiation, the laser radiation being radiated into the workpiece from a radiation entry side and, in an area of a rear side of the workpiece located opposite the radiation entry side, being focused within the workpiece in a focus area such that workpiece material is removed in the focus area by multi-photon absorption, including bringing the rear side of the workpiece, at least in a machining area currently being machined around the focus area, into contact with a free-flowing liquid transparent to the laser radiation, wherein at least some of the liquid is set to flow in a direction towards the machining area such that the liquid flows into the machining area at an acute angle of 60° or less to the rear side.

We also provide a device that produces a structured element by material-removing machining of a workpiece with pulsed laser radiation to perform the method, including a pulsed laser source that produces pulsed laser radiation with a wavelength to which the workpiece material is substantially transparent; a holding apparatus that holds the workpiece in a machining position such that the laser radiation can be radiated onto the workpiece from a beam entry side; focusing optics that focus the pulsed laser radiation through the beam entry side into a focus area on a rear side of the workpiece, located opposite the beam entry side, for the rear-side ablation of material from the workpiece by multi-photon absorption; and a positioning apparatus that variably positions the focus area in relation to the workpiece; and a liquid-providing apparatus that brings the rear side of the workpiece, at least in a machining area currently being machined around the focus area, into contact with a free-flowing liquid, wherein the liquid-providing apparatus has a pump and at least one nozzle that produces a flow of the liquid in a direction towards the focus area, and the nozzle is aligned such that the liquid flows into the machining area at an acute angle of 60° or less to the rear side.

We further provide a structured element consisting of a workpiece material transparent to laser radiation and, on at least one side, having a three-dimensional surface structure, wherein the structured element can be obtained by the method.

DETAILED DESCRIPTION

Figure 1:
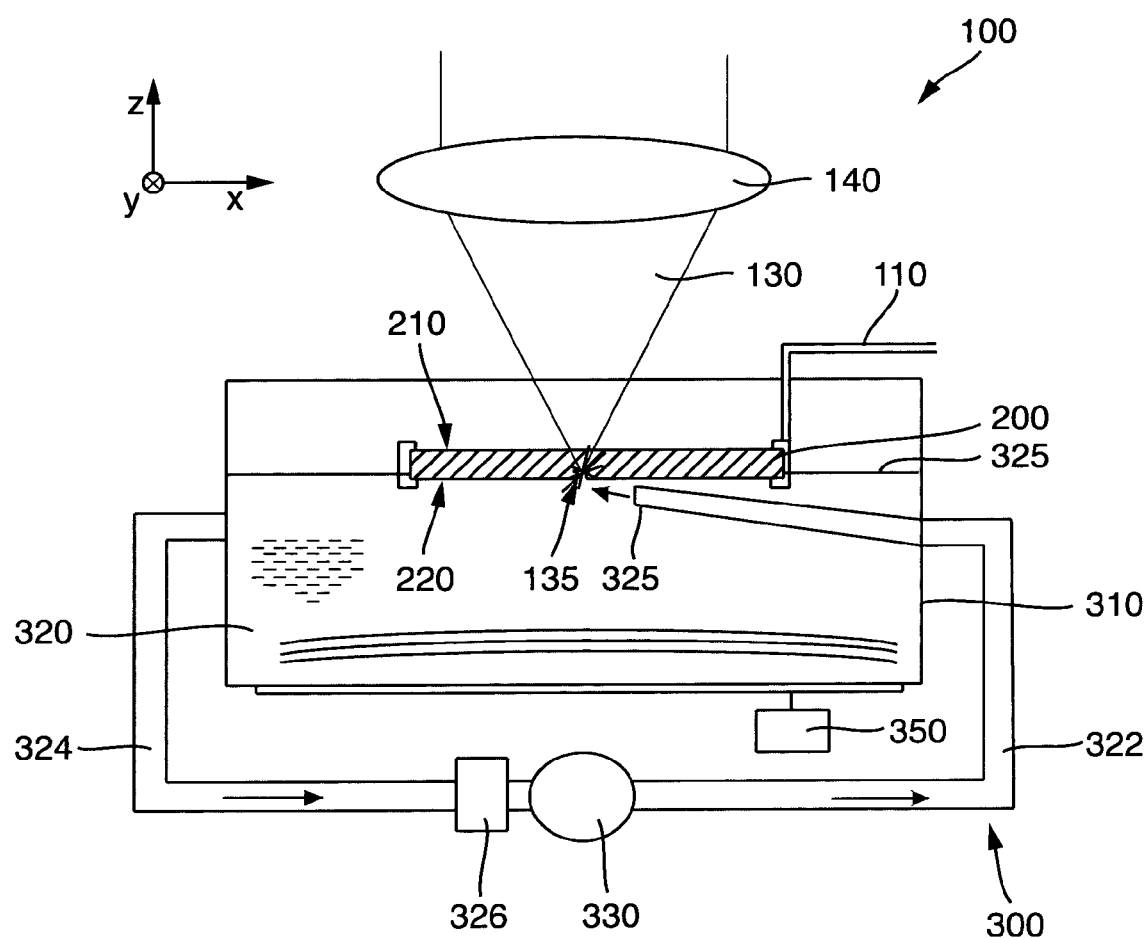
FIG. 1 shows a schematic illustration of some components of an example of a device that produces structured elements by laser beam machining.

We found that, as a result of ablation, large quantities of particles and/or gaseous removal products can arise, which settle on the surface again and can contaminate the latter. In particular in structures with a high aspect ratio and/or in structures with low lateral structural dimensions, the deposits cannot be prevented effectively by a stream of gas since the interior of such structures is reached only poorly by the gas, the material removed can thus not be "flushed out" and can be deposited directly in the interior of holes and similar deep structures and as a result can block the latter again. In particular in structures with low structural sizes, deposition of the ablated material can be made considerably more highly noticeable than in coarser structures. The evaporated material can condense again on the walls of the structures produced. As a result, it is possible for the surface quality of the structures produced to be reduced considerably so that an optical quality is no longer achieved. In addition, sharp edges can be rounded and fine structures blocked. Furthermore, as a rule re-condensed workpiece material is itself no longer transparent to the laser wavelength used, differing from the original workpiece material. Therefore, the laser beam can be absorbed particularly highly here, which can lead to undesired heating.

The rear side of the workpiece, at least in the machining area currently being machined around the focus area, is brought into contact with a free-flowing liquid transparent to the laser radiation. As a result, it is possible to remove the removed material from the possibly narrow interspaces of the structures before it can settle again. The term "transparent" means that the liquid for the laser radiation should act in as little absorbent a manner as possible so that the liquid itself does not interact or barely interacts with the laser radiation. The liquid therefore makes no or substantially no contribution to the ablation process, but can prevent removal products settling again on the structures produced. The microstructure of the exposed surfaces is thus determined virtually exclusively by the laser-induced multi-photon absorption; chemical processes that are difficult to control can be avoided. The shape of the structures produced can thus be predefined exactly via the properties of the laser radiation. The liquid volume should be sufficiently high so that removal products are absorbed into the liquid at their point of origin, are enclosed by the liquid and can be transported away from the point of origin by the liquid.

A device that performs the method has a liquid-providing apparatus designed to bring the rear side of the workpiece, at least in a machining area currently being machined around the focus area, into contact with a free-flowing liquid.

Particularly good maintenance of purity is achieved by at least some of the liquid being set flowing in a direction towards the machining area. As a result, particularly effective transport away of ablation products can be achieved, and detrimental enrichment of ablation products in the vicinity of the focus area can be prevented. In comprehensive trials, we found that particularly good maintenance of purity can frequently be achieved if the liquid flows into the machining area at an acute angle of 60° or less to the rear side. This angle, which can also be designated the inflow angle, designates the angle between the main flow direction of the liquid, for example, predefinable by the orientation of a nozzle, and the rear side. The angle can lie, for example, in the angular range of 20° to 50°, in particular 30° to 45°. A flow running in parallel or at right angles to the rear side (inflow angle, for example, at 15° or less) can even be sufficient in some cases (e.g. relatively flat structures), but we found that by an inflow at an acute angle, even fine interspaces reaching deep into the workpiece between structural elements can effectively be kept clean. If the inflow angle is too shallow, the liquid may possibly not penetrate adequately into interspaces. If, on the other hand, the inflow angle is too steep, it is possible for the transport away no longer to be possible to the desired extent.

To improve machining quality, the liquid-providing apparatus accordingly has a pump and at least one nozzle that produces a flow of the liquid in a direction towards the focus area, wherein the nozzle is aligned such that the liquid flows into the machining area at an acute angle of 60° or less to the rear side.

Water may be used as that liquid brought into contact with the rear side. In principle, this can be water from a public water supply, which is available economically in virtually any desired quantities. If necessary, the water can be purified mechanically (by filtering) and/or chemically before the use as an auxiliary machining liquid. Special additives can be provided but as a rule are not necessary. If water is used, changes in relevant properties of the liquid such as a chemical reaction in the liquid induced by the laser radiation and chemical breakdown of the liquid as a result of the latter, can be avoided so that stable machining conditions can be created in an economical way.

Alternatively, for example, an oil that is non-absorbent to the laser radiation and has a sufficiently low viscosity or a high fluidity can be used as that liquid brought into contact with the rear side.

An improved purity maintaining effect can be achieved in some examples by the liquid in the machining area being set vibrating ultrasonically, permanently or intermittently, during machining. By a flow, removal products can be carried away quickly from the workpiece surface and structures that are not too deep. However, in interspaces in arrays of closely upright columns or pyramids or in holes with a high aspect ratio, it may be difficult to produce a liquid flow to remove all removal products quickly. If an ultrasonic vibration is produced in the liquid and reaches into these interspaces, settling of the removal products on the machined surfaces can be prevented so that the liquid is able to pick up the removal products even in a weak flow or a lack of flow.

The ultrasonic energy can be injected directly into the liquid and transferred to the machining area by the machining liquid. For this purpose, an ultrasonic generator can be in contact with a liquid-carrying element (e.g. a conduit or a nozzle) or an element in contact with the liquid in another way (e.g. a liquid container). Alternatively or additionally, it is also possible to inject the ultrasonic energy via the workpiece to be machined. For example, a holding apparatus for the workpiece can have a quartz oscillator or another ultrasonic generator.

Generation of ultrasound can be provided alternatively or additionally to the production of a liquid flow.

For provision of the liquid, there are different possibilities.

The liquid-providing apparatus may be configured to lead the liquid to the rear side in the form of a free liquid jet (i.e. a free jet). Then, the front side and the rear side of the workpiece can be in the open air, or in the environment atmosphere. Thus, very large workpieces can also be machined, if necessary. In these cases, the holding apparatus is preferably configured such that the workpiece can be held with a horizontal or oblique orientation. The nozzle can be trackable such that optionally with the workpiece not being moved, successive different surface regions can be exposed to the liquid flow.

The liquid-providing apparatus may have a liquid container that can be filled with the liquid and is arranged in relation to the holding apparatus such that the workpiece held in the holding apparatus can dip into the liquid, at least with the rear side. The liquid level in this liquid bath can be matched appropriately to the position of the workpiece.

It is possible that the workpiece is only immersed partly so that the rear side is in flat contact with the liquid, while the beam entry side is dry or not wetted. Injection of the laser radiation can then be carried out under well-defined refraction conditions via the dry beam entry side.

It is also possible that the workpiece is immersed completely in the liquid so that the beam entry side is also wetted. For this case, an injection element transparent to the laser radiation and through which the laser radiation is injected into the liquid can be provided between the focusing optics and the holding apparatus. The injection element can, for example, have the form of a plane parallel plate. As a result, it is possible to avoid possible movement of the liquid surface having any effect on the position and the form of the focus area.

For machining, a short-pulse laser can be used, e.g. a nanosecond laser (ns-laser), having pulse lengths in the region of a few nanoseconds ($10^{-9}$ s). We found that, as a result, structural sizes down into the range of a few 100 µm can in principle be produced. As a result of the use of ns-lasers, considerable cracking in the area of the laser irradiation frequently manifested itself during the machining, as a result of which parts of the workpiece material were literally blasted off. This limits the minimum structure sizes. Structures having small dimensions cannot be produced.

Preferably, ultra-short-pulse laser radiation is radiated in for the material-removing machining, preferably with a pulse length of at most 50 picoseconds (ps). A device for this purpose comprises an ultra-short-pulse laser as pulsed laser source. As a result of the use of the ultra-short pulses for the material removal, the thermal influence on the workpiece is minimized, i.e. only extremely low or no heating of the workpiece material around the machining point takes place. According to appropriate machining trials, a thermally influenced zone could not be seen. If ultra-short pulses are used, even the cracking already mentioned, which can occur when an ns-laser is used, can be avoided to the greatest possible extent. Therefore, smaller structures and/or more cleanly defined surfaces of the structured elements can be produced with ultra-short-pulse lasers than with lasers with longer pulse lengths.

To be able to produce structures with predefinable shapes, sizes, depths and the like on the workpiece or on the rear side of the latter, the device has a positioning apparatus for variable positioning of the focus area in relation to the workpiece. The positioning apparatus can, for example, have a laser beam deflection apparatus for controllable deflection of the laser radiation in relation to the workpiece, for example, having a galvanometer scanner.

It is possible to structure only the rear side, while the front side of the workpiece remains unchanged or unstructured. It is also possible to create (one or more) passage openings in the workpiece, which pass from the rear side to the front side such that a mouth is produced on the front side. To prevent liquid from passing through the resulting passage opening from the rear side to the front side during machining and possibly disrupting machining at the front side, in some examples, a nozzle element connected downstream of the focusing optics having a nozzle opening is provided, through which the laser radiation can pass, wherein the nozzle element is configured, when connected to a compressed gas source, to generate a gas flow directed at the jet-inlet side. By way of this gas flow, liquid can optionally be prevented from emerging at the front side.

Further advantages emerge from the following description of preferred examples, which are explained below by using the figures.

FIG. 1 shows a schematic illustration of some components of an example of a device 100 that produces structured elements by material-removing machining of a workpiece 200 with pulsed laser radiation. The device has a pulsed laser source, not illustrated, in the form of an ultra-short-pulse laser that produces pulsed laser radiation with a pulse length in the region of 12 ps (picoseconds) and a wavelength of 1064 nm.

The workpiece 200 in the example consists of sapphire ($Al_2O_3$) and has the form of a plane parallel plate with a level front side 210, a rear side 220 parallel thereto and a workpiece thickness, measured between the latter, of about 600 µm. The workpiece is held substantially horizontally in a machining position by a holding apparatus 110. The workpiece material is largely transparent to the laser radiation. Attenuation of the laser beam by the material was not measurable so that an absorption in the low percentage range or below (less than 1%) is assumed. In other examples, a workpiece made of glass material was structured, for example, one made from a soda-lime glass.

Furthermore, the device 100 has a beam guidance system that guides the laser radiation and produces a laser beam 130 that can be aimed substantially vertically downwards onto the upwardly pointing front side of the workpiece, which serves as the beam entry side. The laser beam, widened with the aid of a beam expander, is deflected by the mirror arrangement of a galvanometer scanner in the direction of focusing optics 140 which, during the laser beam machining, focus the laser beam onto a focus area 135 predominantly located in the interior of the workpiece in the vicinity of the rear side 220 of the workpiece that follows the front side.

The focusing optics 140 are implemented as telecentric f-theta optics and are matched to the deflection range of the galvanoscanner and the properties of the incident laser beam such that the focused laser beam has substantially the same beam properties in every focusing position within a two-dimensionally expanded working area in the vicinity of the rear side 220 of the workpiece. The f-theta optics thus ensure that the focus area of the deflected laser beam does not move on a spherical surface but can move on a plane.

The galvanometer scanner and the focusing optics are functional components of a positioning apparatus, with which the position of the focus area 135 in relation to the workpiece can be changed specifically under the control of a control program. Relative movements in an x-y plane at right angles to the optical axis of the focusing optics and at right angles thereto (in the z direction) can be controlled independently of one another. The subassembly having focusing optics and scanner can be raised (in the z direction) and lowered. The workpiece is displaced only in the x-y plane.

The device includes a liquid-providing apparatus 300 designed to bring the rear side 220 of the workpiece, at least in a machining area currently being machined around the focus area 135, into contact with a free-flowing liquid 320. The liquid-providing apparatus has a liquid container 310 open at the top and, for the machining operation, is filled with a liquid 320 such that the liquid level 325 is located somewhat above the level of the rear side of the workpiece but below the level of the front side (beam entry side) 210. The rear side is thus immersed in the liquid, while the beam entry side remains dry. The liquid here is water, which is non-absorbent and transparent to the laser radiation.

The liquid-providing apparatus has a closed liquid circuit. A pump 330 has an outlet on the pressure side connected via a liquid conduit 322 led laterally into the interior of the liquid container to a nozzle 325 at the end of the liquid conduit. The nozzle is aligned such that liquid delivered by the pump flows into the machining area in the focus area 135 at an acute angle of about 10° to 20° obliquely with respect to the rear side 220. From the opposite side, a further liquid conduit 324 leads through a particle filter 326 to the suction side of the pump.

In the bottom area of the liquid container, an ultrasonic generator 350 that can inject ultrasonic energy into the liquid via the container bottom, which is capable of vibration, is fitted to the outside.

In trials, the device was operated as follows, for example.

The laser beam from the ultra-short-pulse laser (pulse length 12 ps, wavelength 1064 nm, power<2 W, repetition rate 400 kHz, diffraction index $M^2<1.3$) was focused onto the rear side of the transparent workpiece.

By nonlinear absorption in the area of the focus, that is to say the focus area 135, material ablation takes place within the workpiece material, starting from the rear side 220 of the workpiece 200. The distance between focusing optics and the workpiece is increased during irradiation such that the focus area of the beam remains on the rear-side material surface, for example, on the bottom of a blind hole produced by the ablation. For ablation in the depth direction (z direction, at right angles to the rear side), focus tracking therefore takes place.

As a result of the use of the ultra-short pulses, the thermal influence on the workpiece is minimized, i.e. only extremely low or no heating of the workpiece material takes place around the machining point. A thermally influenced zone could not be seen after the trials. As a result, even the possible cracking when longer pulses are used is avoided. Therefore, smaller structures can be produced with ultra-short-pulse lasers than with lasers with longer pulse lengths.

In the absence of a liquid, because of the low structure sizes, deposition of the ablated material could make itself considerably more highly noticeable. The evaporated material could condense again on the walls of the structures produced. As a result, the surface quality of the structures produced could decrease considerably. In addition, as a rule re-condensed workpiece material is no longer transparent to the laser wavelengths used, differing from the volume material of the workpiece—during trials in air, this deposit appeared to be white. Therefore, the laser beam was particularly highly absorbed here, which could lead to undesired heating.

With the aid of the liquid 320, it was possible to remove the removed material from the narrow interspaces of the structures before it could settle again. To this end, the rear side of the workpiece was brought into contact with the transparent liquid (water) during the laser machining, e.g. by the workpiece being placed on a holder in a basin or liquid container and this basin being filled with the liquid as far as the underside (rear side) of the workpiece. In this liquid, a flow is produced by the pump. Removal products can be carried away from the workpiece surface by this flow.

There should always be flow towards the area of the workpiece currently being machined. During the trials, with a stationary nozzle an area with a diameter of about 7 mm could be machined. For the machining of larger areas, the nozzle was tracked by a tracking apparatus.

It may be that, in the interspaces in arrays of closely upright columns or pyramids and/or in holes with a high aspect ratio, there is no liquid flow or only a low liquid flow that could remove these removal products. Therefore, preferably by activating the ultrasonic generator 350, an ultrasonic vibration is additionally produced in the liquid, which reaches into these interspaces and thus prevents the settling of the removal products.

In the trials that were carried out, it transpired that the best action is achieved if the flow towards the workpiece takes place at an acute angle of, for example, 10° to 45° to 50° (measured between the main direction of the flow and the rear side), for example, as shown in FIG. 1.

The filter 326 removes the removal products from the water circuit so that the products cannot reach the flow onto the workpiece again. Care was taken that the flow was not reduced too severely by a full filter. The filter was changed in good time or at regular intervals. Possibly, the flow rate of the water circuit can be monitored with a suitable measuring device to control change intervals for the filter. In the example, a flow rate of about 30 ml/min was used, which flowed towards the workpiece through a conduit of 4 mm diameter.

A use of the ultrasonic generator 350 on its own without any flow towards the sample is likewise possible. This procedure permits short-term machining in accordance with this method. However, during machining, gas bubbles can be produced in the liquid as a result of heating the irradiation point. Without the liquid flows, these can collect under the workpiece after some time so that an air bubble can be produced here. As a result, transporting the removal products away could be made more difficult. In most of the method variants, both mechanisms—ultrasound and liquid flow—are therefore used in combination.

In addition to removal of the removal products, the liquid also has a cooling action, by which the influence of heat on the workpiece is further reduced.

Figure 2:
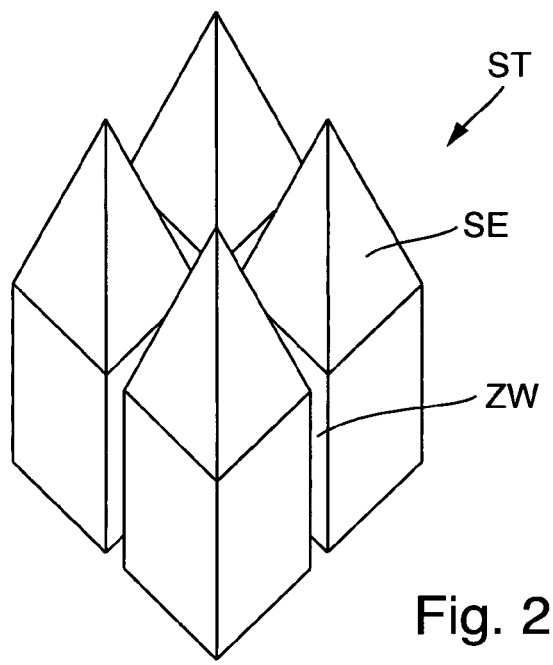
FIG. 2 shows, by way of example, a 3D model of a structure to be produced by machining the workpiece rear side.

For control of the procedure, there are different possibilities. If the 3D structures to be produced are present as 3D models, these can be broken down by the software that controls machining into individual planes or plane layers parallel to the workpiece surface (in a way similar to that in 3D printing or laser sintering). FIG. 2 shows by way of example a 3D model of a structure ST, the structural elements SE of which are shaped in the manner of obelisks with a square cross section and pyramidal tips that form a 2D grid with narrow interspaces ZW.

Figure 3:
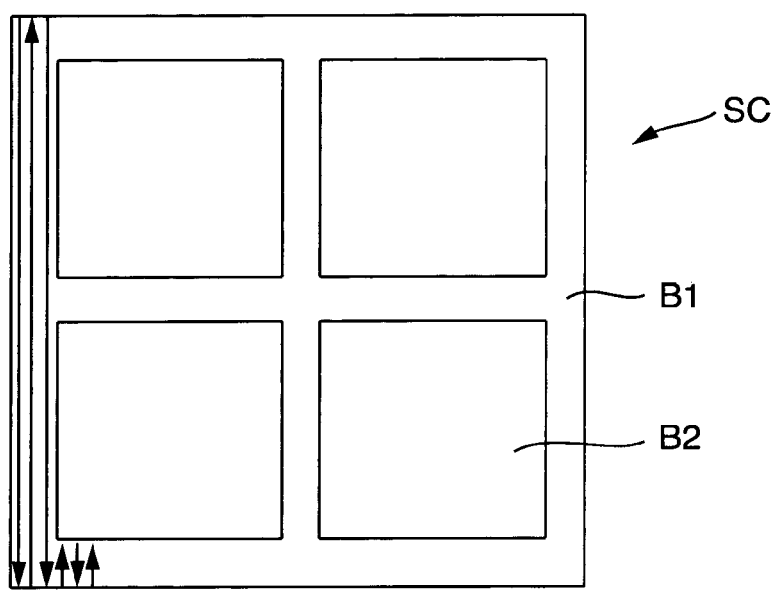
FIG. 3 shows, schematically, a layer at the lower end of the structure in FIG. 2 during the laser beam machining.

The layers to be removed can have a thickness of about 3 to 8 μm, for example. The thickness of these layers depends on the material and can be determined in prior trials. FIG. 3 shows by way of an example a layer SC at the lower end of the structure in FIG. 2. Each of these individual layers contains first regions B1, in which the workpiece material is to be removed by laser ablation, and second regions B2, in which the workpiece material is to be retained. As shown by way of example in FIG. 3, the first regions B1 are scanned with the beam during machining of the plane (arrows), i.e. a relative movement in the x-y plane takes place between the focus area of the laser beam and the workpiece so that the entire region to be removed is swept over by the laser beam. In the trials, operations were carried out with a scanning speed of 400 mm/s and a lateral spacing of the scan lines of 5 µm.

If the structure is not present as a 3D model, then the path of the laser beam over the workpiece can also be programmed by hand.

In the example described above, the relative movement between workpiece and laser beam is produced by the galvanometer scanner, while the focusing optics comprises an f-theta objective. With an f-theta objective with a focal length of 45 mm, a focus diameter of 8-9 µm resulted. Therefore, structures with the lateral dimensions of the remaining structural elements and/or the interspaces exposed between the structural elements in the region of 50 µm were produced. The structure depth can be a multiple of these values.

Following completion of the irradiation of a layer or plane, the focus area (focal point) of the laser beam is tracked so that the next layer or plane can be machined. For this purpose, the workpiece or the scanner having the focusing optics can be moved in the direction of the beam (z axis). It is likewise possible to vary the focal length of the focusing optics slightly by a movable lens.

Figure 5:
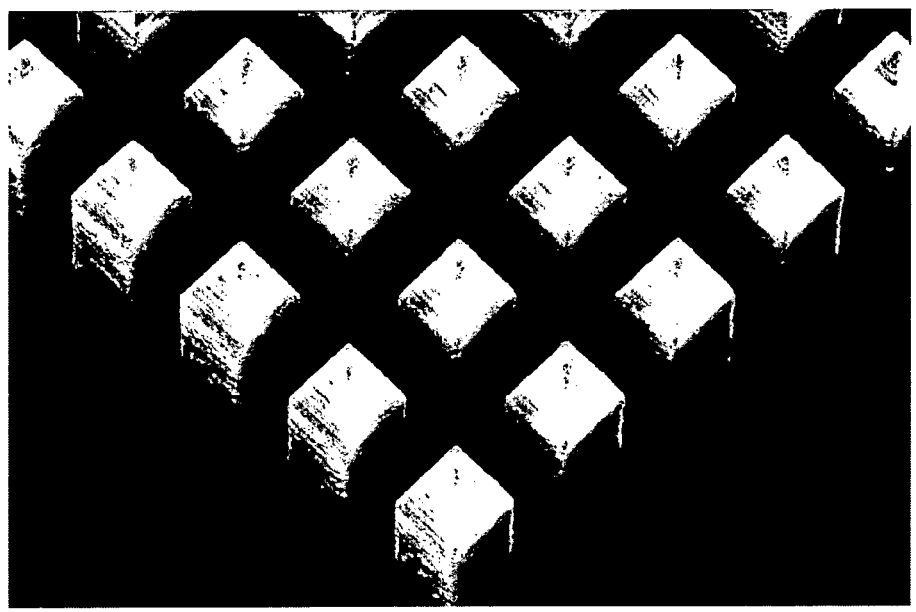
FIG. 5 shows a scanning electron microscope image of a structure, produced by the method on the rear side of an element.

In FIG. 5, an SEM image of the structured rear side of an element produced with the aid of the method is shown. The remaining structural elements have the form of columns with a square cross section and pyramidal tips arranged in a grid in orthogonal rows and columns. Located in between are canyon-like interspaces, the lateral clear width of which (about 50 µm) approximately corresponds to the width of the structural elements or is somewhat smaller, while the depth is at least four times as great.

Alternatively, instead of a galvanometer scanner that moves the laser beam over the (non-moved) workpiece, it is also possible for a stationary laser beam to be used and for the workpiece to be moved instead of the laser beam. In this case, focusing optics having one or more lenses that focus the laser beam onto a fixed point can be used. While the workpiece is moved in the liquid or at the interface between liquid and air in the plane perpendicular to the incident laser beam, the outlet opening of the liquid feed remains in a fixed position.

Figure 4:
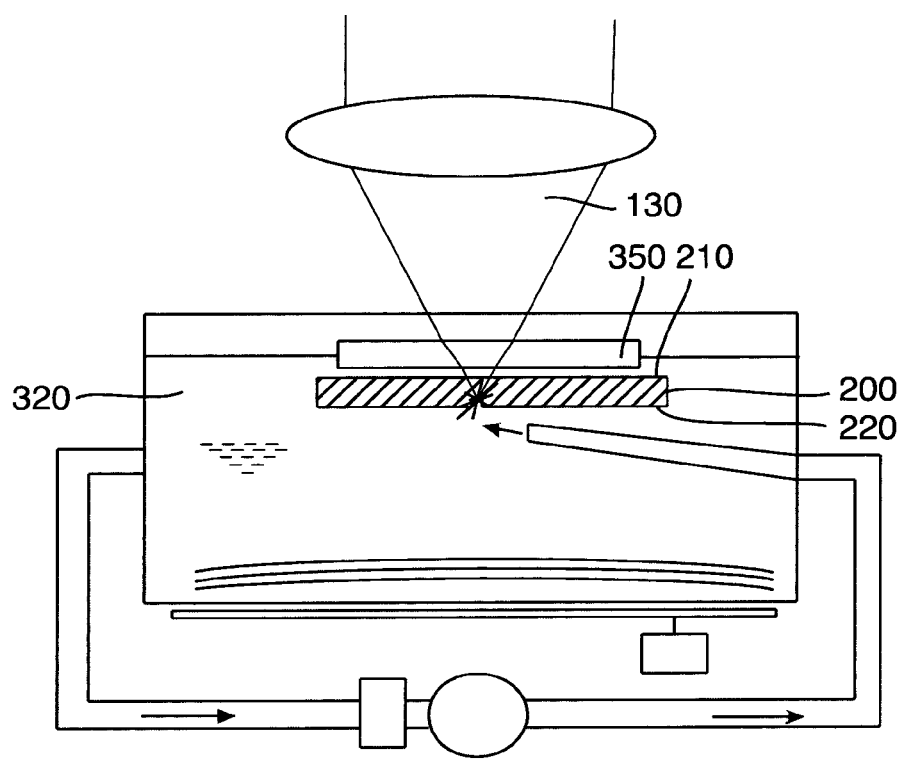
FIG. 4 shows a variant of the example from FIG. 1 with a completely immersed workpiece and a special injection element for injecting the laser beam into the liquid.

Complete immersion of the workpiece 200 in the liquid 320 is possible. FIG. 4 shows a corresponding example. Since use is made of a liquid transparent to the wavelength used, the workpiece can be immersed completely during machining. To inject the laser beam 130 into the liquid, however, an additional optical lens or other transparent injection element 350 should be placed at the interface between liquid 320 and air. The other components can correspond to the example from FIG. 1. Reference is made to the description there.

Spiral drilling optics can likewise be used. The focus should be located on the rear-side workpiece surface, as in the other examples. By using the same, above all round holes can be produced with extremely high precision.

A use of focusing optics is described but with a less deflected laser beam instead of with a stationary laser beam. To deflect the laser beam, mirror holders with incorporated piezo actuators can be used. These holders are placed in front of the focusing optics and permit the adjustment of the angle with which the laser beam strikes the focusing optics (when a single such holder is used) or the independent adjustment of angle and point of impingement on the focusing optics (in two holders). As a result, the laser beam can be moved in a small area on the workpiece without using a galvanometer scanner.

In the examples described in detail, the workpiece was held horizontally such that the rear side is located underneath and dips into a liquid bath. The laser beam is radiated in from above. This is not imperative. It is also possible to position the workpiece obliquely or on edge (rear side aligned vertically) in the liquid bath.

The liquid can be led to the rear side in the form of a free liquid jet. Here, too, the workpiece can be aligned horizontally or obliquely.

Previously machined workpieces were at least 100 µm thick. If the workpiece becomes too thin, it becomes more difficult to limit the focusing to the rear side of the material without at the same time producing removal on the front side. This restriction can be avoided by using a different objective with a shorter focal length and therefore a shorter Rayleigh length. In addition, in thin substrates, positioning becomes more difficult—the workpiece should be positioned such that the upper side does not get below the water level. The maximum workpiece thickness was 3 mm. With the structure used, however, even thicker workpieces can also be machined, for example, up to 20 mm or more.

The frequency range of the ultrasonic vibrations used previously was around 50-60 kHz. During the machining, fixed frequencies were used. A frequency sweep with a periodic change in the frequency would likewise be possible. In addition, the workpiece itself can in principle be excited to vibrate. In the process, the workpiece should then not be mechanically stressed too highly and the vibration amplitude should not be so high that focusing the laser beam into the workpiece material close to the rear side is made much too difficult.

Machining can be carried out at room temperature. At the start of the machining process, the water had a temperature of about 20° C., during machining, it heated up to about 40° C. In this temperature range, no influence of the temperature on the machining could be determined. Temperature control can be provided.

For the machining process, mains water is used. Depending on the water hardness, demineralized water should possibly be used to avoid scale deposits on the workpieces.

Structured elements having structures produced by this method can be used, for example, as masters for molding. As a result of molding from a glass master, it is possible to produce a mold that in turn, allows copies of the original master structure to be produced, for example, from plastic. For good quality of the molded components, a good surface quality of the structural elements is beneficial, for which reason the method described is particularly suitable. Structured elements can also be used as embossing stamps pressed into another material.

The three-dimensional structures can be, for example, simple holes with a hole cross section that is uniform or varies in the axial direction, pyramidal or truncated-pyramidal structures, obelisks or columns or the like.

Transparent materials can be chosen such that, at least in the visible spectral range (VIS, e.g. between 380 nm and 780 nm) and/or in the near infrared range (NIR, between 780 nm and around 3000 nm), they exhibit high transmission or low absorption. The transparent material can be, for example, a glass, e.g. quartz glass ($SiO_2$) or soda-lime glass, or a crystalline material, e.g. a fluoride material or oxide material such as sapphire ($Al_2O_3$), for example.

Figure 6:
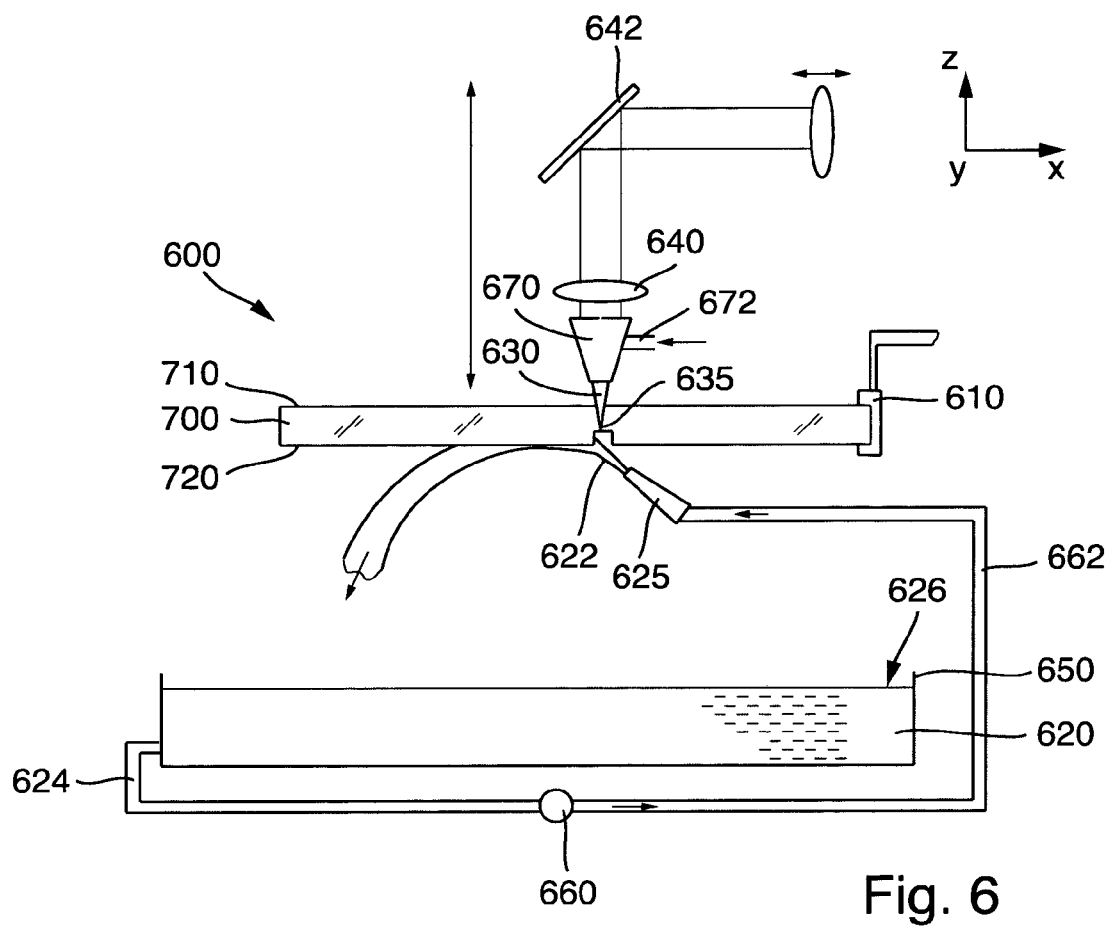
FIG. 6 shows an example of a device and a method of producing structured elements by laser beam machining, wherein a free liquid jet is directed at the rear side of the workpiece.
Figure 7:
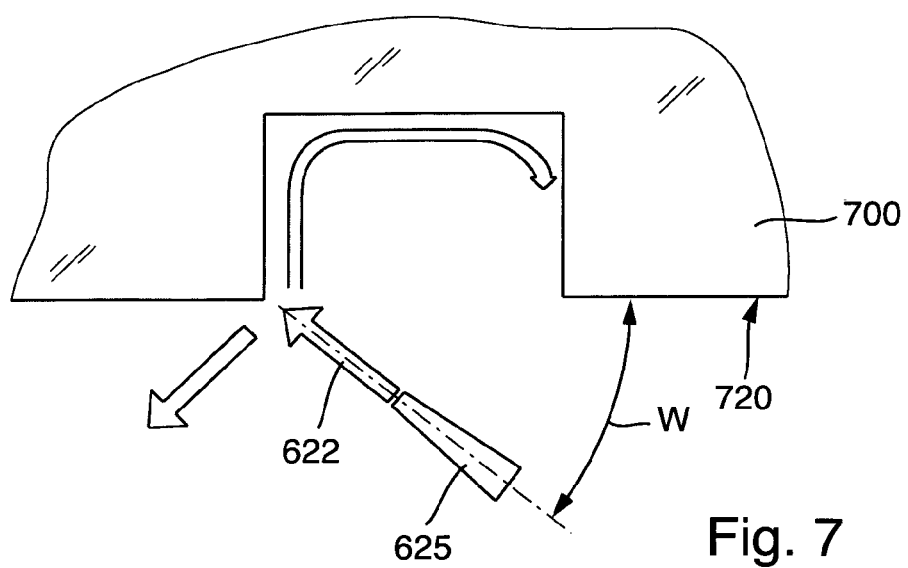
FIG. 7 schematically shows the course of the liquid flow in a depression produced on the rear side.
Figure 8A:
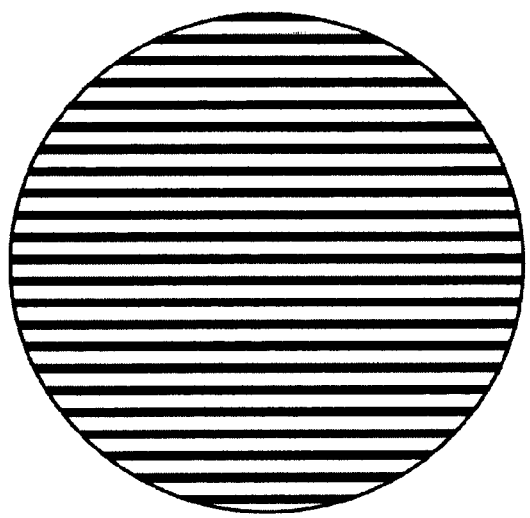
FIGS. 8A and 8B schematically show the laser beam guidance in two successively effected machining phases of producing a cylindrical hole in the rear side of a workpiece.
Figure 8B:
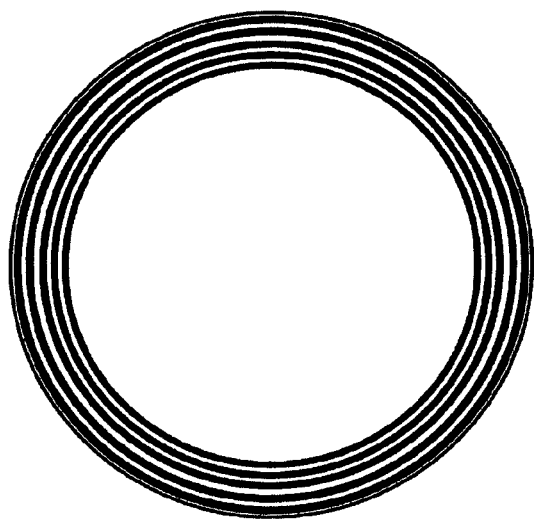

With reference to FIGS. 6 to 8, examples are described that are particularly suited and adapted inter alia to machining particularly large workpieces and/or producing passage holes.

FIG. 6 shows components of one example of a device 600 that produces structured elements by material-removing machining of a workpiece 700 with pulsed laser radiation.

The workpiece 700 has the form of a plane parallel plate with a level front side 710 and a rear side 720 parallel thereto. The workpiece is held substantially horizontally in a machining position by a holding apparatus 610. The workpiece material is largely transparent to the laser radiation.

The device 600 has a beam guidance system that guides the laser radiation and produces a laser beam 630 that can be aimed substantially vertically downwards onto the upwardly pointing front side of the workpiece (beam entry side). The widened laser beam is deflected by the mirror arrangement of a galvanometer scanner (with scanner mirror 642) in the direction of focusing optics 640 (e.g. telecentric f-theta optics) which, during the laser beam machining, focus the laser beam onto a focus area 635 which is predominantly located in the interior of the workpiece in the vicinity of the rear side 720 of the workpiece.

The galvanometer scanner and the focusing optics are functional components of a positioning apparatus, with which, as in the above examples, the position of the focus area 635 in relation to the workpiece can be changed specifically and independently in the vertical direction and horizontal direction under the control of a control program.

Arranged between the focusing optics and the workpiece plane, i.e. downstream of the focusing optics in the beam direction, is a nozzle element 670 having a nozzle opening through which the laser beam 630 can pass. The nozzle element is provided, when the gas connection 672 connects to a compressed gas source, to generate a gas flow directed at the beam entry side (front side of the workpiece). As a result, the beam entry area can be subjected to compressed gas (e.g. compressed air).

The device includes a liquid-providing apparatus designed to bring the rear side 720 of the workpiece, at least in a machining area currently being machined around the focus area 635, into contact with a free-flowing liquid (e.g. water). The liquid-providing apparatus has a liquid container 650 open at the top and, for the machining operation, is partially filled with a liquid 620. The liquid container serves as a storage container and collecting vessel. The liquid level 626 is some way below the rear side 720 of the workpiece such that the rear side and the beam entry side remain dry before machining begins.

The liquid-providing apparatus has a liquid circuit. A pump 660 has an outlet on the pressure side connected via a liquid conduit 662 to a nozzle 625 at the end of the liquid conduit. The nozzle is aligned such that liquid delivered by the pump flows as a free liquid jet (free jet) 622 into the machining area in the focus area 135 at an acute angle W of about 30° to 60° obliquely with respect to the rear side 720, and drips or runs back into the liquid container therefrom. From the opposite side, a further liquid conduit 624 leads through a particle filter to the suction side of the pump 660.

With this device, for example, the following method variants can be carried out.

In the method, both the front side 710 and the rear side 720 of the workpiece 700 to be machined are in the open air. The workpiece is mounted such that the area to be machined is freely accessible from the rear side.

Irradiation with the laser beam 630 takes place, as described above, from the front side, wherein the laser beam is focused on the rear-side surface such that, in the area of the focus, material removal takes place on account of the non-linear absorption brought about by the high energy density. Above the focus area 635, the laser beam passes through the transparent workpiece 700 virtually without any material-changing interaction.

From the rear side 720, a free liquid jet 622 is directed to the workpiece such that the liquid (in this example water) wets a limited area, around the focus area, to be machined. The liquid flow onto the workpiece can be maintained throughout the laser irradiation period such that the machining area is constantly in contact with the liquid. As a result, ablation residues that arise are removed from the machining point during the machining to avoid soiling of the workpiece.

With this method, in one trial, cylindrical passage holes having a diameter of 500 μm were produced in 1.3 mm thick glass. The laser beam (wavelength 532 nm, pulse length 12 ps, repetition rate 400 kHz, average power 1.6 W) was focused onto the rear side of the workpiece by focusing optics with a focal length of 60 mm. Longer focal lengths such as 100 mm, for example, can likewise be used. Located upstream of the focusing optics in the beam path is a galvanometer scanner arrangement, with which the laser beam can be moved in the x and y direction parallel to the workpiece surface in the machining plane.

The beam diameter in the focus plane was about 10 μm. To produce a hole with a diameter of 500 μm with this laser beam, it was guided over the workpiece in two different movement patterns with the aid of the scanner. The first movement pattern (cf. FIG. 8A) consisted of parallel lines at a spacing of 6 μm, which filled the entire area to be removed. The second movement pattern (cf. FIG. 8B) consisted of five concentric circles at a spacing of 6 μm around the periphery of the area to be removed. For example, the beam can be guided in the first movement pattern in a first machining plane on the underside of the workpiece, and in this way a material layer with a thickness of about 5 μm can be removed. Subsequently, the entire optical structure having focusing optics and galvanometer scanner can be moved upwards away from the workpiece (z direction) by this amount and the focus of the laser beam can as a result be moved by the same distance in the direction of the substrate surface (front side 710). The laser beam can then be guided with the second movement pattern (FIG. 8B) in the next machining plane. Thereupon, a movement in the z direction and removal with the first movement pattern can take place again.

Instead of moving the entire optical structure, the focal position along the z axis can also be changed with an additional lens (optional lens 645) that is movable along the beam axis. Instead of alternating the two movement patterns, the entire removal can also take place by using only the first movement pattern (linear pattern according to FIG. 8A); alternating between the two patterns allows quicker machining, however, without reducing the quality of the surface of the hole. It is likewise possible to use only the second movement pattern to produce a passage hole.

Distilled water was guided onto the rear side of the workpiece with the aid of a nozzle 625 with a diameter of 1 mm. The nozzle was in this case arranged at an angle W of about 60° to the surface. The flow rate was 250 ml/min or less. The point of impingement of the water jet on the workpiece surface was selected such that a noticeable amount of the water passed into the hole. This was achieved in that the water jet was directed at the rear edge of the hole as seen from the nozzle. The water then flows back out of the hole along the opposite side of the latter (cf. FIG. 7). Rather than flowing into the hole, some of the water also flows a short distance along the rear-side workpiece surface. The described water flows carry along the ablation residues and remove these from the substrate surface. The water with the ablation residues was collected in a vessel (liquid container 650) under the workpiece and returned to the nozzle again with the aid of a pump and after the impurities had been filtered out.

Water should be prevented from passing through the hole and wetting the upper side (front side 710) of the workpiece. The residues carried along by the water could contaminate this surface. Moreover, the refractive index changed by the water could disrupt the focusing of the laser beam. Therefore, in the example of FIG. 6, a nozzle element 670 with an opening diameter of 2 mm, through which the laser beam 630 passes, is located between the focusing optics and the workpiece surface. This nozzle element is provided with a gas connection, through which compressed air or an inert gas such as nitrogen can be introduced. A gas flow is guided through the nozzle in one area onto the upper side (front side) of the workpiece, which is opposite the machining position on the underside (rear side). As soon as the passage hole has been opened by the laser machining, the gas flow passes through the hole and pushes the inflowing water back down out of the latter such that the water cannot reach the upper side. The opening of the gas nozzle can also have other diameters. For smaller structures to be produced, the diameter can likewise be smaller, for example, 1 mm. For an arrangement of several small structures, the nozzle can be configured such that the entire arrangement is subjected to a gas flow.

Following completion of a passage hole, a relative movement between the workpiece and the machining unit can be carried out to pass to the next machining position. This can take place by moving the workpiece, but also by simultaneously moving the optical structure including the gas nozzle and the nozzle (liquid nozzle 625) for the liquid jet.

In another application example of the method, passage holes having a diameter of about 20 μm were produced in a glass substrate with a thickness of 300 μm. In this case, the laser beam was guided along a circular contour during machining. The distance between the machining planes was reduced to about 2 μm. With this hole geometry, it was possible to dispense with the gas flow since the risk of liquid emerging here was low.

While in the first example the scanning area of the laser beam was limited by the gas nozzle (nozzle element 670), when the latter is dispensed with, the entire scanning area of the galvanometer scanner of, for example, 45×45 mm can be exploited, with the result that a large number of holes located close together can be produced in quick succession without relative movement between optical unit and workpiece. When a single hole or several holes located in a relatively small working area are produced, the water jet can be directed here again at the hole through a round nozzle with a 1 mm diameter, wherein the volume flow of the water should be reduced considerably compared to the larger holes, however. It is advantageous to subject an area of the workpiece greater than only one individual hole to the water jet. This can take place, for example, through a nozzle that produces a liquid jet with a more elliptical or linear cross section.

The invention claimed is:

1. A method of producing a structured element by material-removing machining of a workpiece with pulsed laser radiation,
   the workpiece consisting of a workpiece material transparent to the laser radiation, the laser radiation being radiated into the workpiece from a radiation entry side and, in an area of a rear side of the workpiece located opposite the radiation entry side, being focused within the workpiece in a focus area such that workpiece material is removed in the focus area by multi-photon absorption, comprising bringing the rear side of the workpiece, at least in a machining area currently being machined around the focus area, into contact with a free-flowing liquid transparent to the laser radiation, wherein at least some of the liquid is set to flow in a direction towards the machining area such that the liquid flows into the machining area at an acute angle of 60° or less to the rear side.

2. The method according to claim 1, wherein the angle is 20° to 60°.

3. The method according to claim 1, wherein the liquid in the machining area is set vibrating ultrasonically during the machining, and ultrasound is injected into the liquid and transferred to the machining area by the machining liquid.

4. The method according to claim 1, wherein the liquid is led to the rear side in the form of a free liquid jet, and the workpiece is oriented horizontally or obliquely.

5. The method according to claim 1, wherein the liquid is provided in a liquid container and the workpiece is dipped into the machining liquid, at least with its rear side.

6. The method according to claim 1, wherein ultra-short-pulse laser radiation is radiated in for the material-removing machining, and ultra-short-pulse laser radiation with a pulse length of at most 50 picoseconds is radiated in.

7. A device that produces a structured element by material-removing machining of a workpiece with pulsed laser radiation to perform the method according to claim 1, comprising:
   a pulsed laser source that produces pulsed laser radiation with a wavelength to which the workpiece material is substantially transparent;
   a holding apparatus that holds the workpiece in a machining position such that the laser radiation can be radiated onto the workpiece from a beam entry side;
   focusing optics that focus the pulsed laser radiation through the beam entry side into a focus area on a rear side of the workpiece, located opposite the beam entry side, for the rear-side ablation of material from the workpiece by multi-photon absorption; and
   a positioning apparatus that variably positions the focus area in relation to the workpiece; and
   a liquid-providing apparatus that brings the rear side of the workpiece, at least in a machining area currently being machined around the focus area, into contact with a free-flowing liquid, wherein the liquid-providing apparatus has a pump and at least one nozzle that produces a flow of the liquid in a direction towards the focus area, and the nozzle is aligned such that the liquid flows into the machining area at an acute angle of 60° or less to the rear side.

8. The device according to claim 7, wherein the liquid-providing apparatus is configured to lead the liquid to the rear side in the form of a free liquid jet, and the holding apparatus is configured to hold the workpiece with a horizontal or oblique orientation, and/or the nozzle is trackable.

9. The device according to claim 7, wherein the liquid-providing apparatus has a liquid container that can be filled with the liquid and is arranged in relation to the holding apparatus such that the workpiece held in the holding apparatus can dip into the liquid, at least with the rear side.

10. The device according to claim 7, wherein an injection element arranged between the focusing optics and the holding apparatus, is transparent to the wavelength of the laser radiation and designed to inject the laser radiation into the liquid held in the liquid container.

11. The device according to claim 7, comprising an ultrasonic source that produces an ultrasonic vibration in the liquid, at least on the rear side in the machining area.

12. The device according to claim 7, wherein the pulsed laser source is an ultra-short-pulse laser source and a pulse length of the pulsed laser radiation is at most 50 ps.

13. The device according to claim 7, wherein the positioning apparatus has a laser beam deflection apparatus for the controllable deflection of the laser radiation in relation to the workpiece.

14. The device according to claim 7, further comprising a nozzle element connected downstream of the focusing optics and having a nozzle opening through which the laser radiation can pass, and the nozzle element is configured, when connected to a compressed gas source, to generate a gas flow directed at the jet-inlet side.

15. A structured element consisting of a workpiece material transparent to laser radiation and, on at least one side, having a three-dimensional surface structure, wherein the structured element can be obtained by the method according to claim 1.

* * * * *